United States Patent
Pao et al.

[15] 3,663,833
[45] May 16, 1972

[54] SQUARE ROOT EXTRACTOR FOR A PROCESS CONTROL SYSTEM

[72] Inventors: Robert K. C. Pao; Louis H. Fricke, Jr., both of St. Louis, Mo.

[73] Assignee: Monsanto Company, St. Louis, Mo.

[22] Filed: Apr. 2, 1970

[21] Appl. No.: 25,126

[52] U.S. Cl. ............................307/229, 307/230, 328/144, 235/193.5
[51] Int. Cl. .......................................................G06g 7/12
[58] Field of Search ..................328/144, 229, 230; 307/229, 307/230; 235/193.5

[56] References Cited

UNITED STATES PATENTS

| | | | |
|---|---|---|---|
| 3,436,559 | 4/1969 | Wajs | 307/229 |
| 3,435,319 | 3/1969 | Richman | 324/105 |
| 3,550,020 | 12/1970 | Gill et al. | 307/229 |
| 3,371,224 | 2/1968 | Polo | 307/229 |
| 2,951,211 | 8/1960 | Brashear | 324/99 |
| 3,408,582 | 10/1968 | Britton | 328/145 |

Primary Examiner—John S. Heyman
Assistant Examiner—Harold A. Dixon
Attorney—John D. Upham, Harold R. Patton and William J. Bethurum

[57] ABSTRACT

A square root extractor circuit adapted for operation in a process control loop wherein a differential pressure transducer generates a process variable signal which is proportional to the square of the flow rate of the process being controlled. The square root extractor circuit includes a nonlinear amplifier having a nonlinear feedback network therein including a plurality of parallel connected electroresponsive devices. These electroresponsive devices are successively biased into conduction in response to an increasing level of the input signal applied to the nonlinear amplifier, so that the amplifier has a smooth, exponentially shaped voltage gain characteristic which approximates the square root function.

11 Claims, 4 Drawing Figures

INVENTORS
ROBERT K. C. PAO
LOUIS H. FRICKE, JR.

BY *William J. Bethurum*
ATTORNEY

Patented May 16, 1972

INVENTORS
ROBERT K. C. PAO
LOUIS H. FRICKE, JR.
BY
William J Bethurum
ATTORNEY

SQUARE ROOT EXTRACTOR FOR A PROCESS CONTROL SYSTEM

FIELD OF THE INVENTION

This invention relates generally to an electronic process control system and more particularly to an improved square root extractor circuit for use in such systems for linearizing the output signal of a differential pressure transducer within the control system.

BACKGROUND OF THE INVENTION

There are many closed loop servo-type systems for controlling different variables of a process, and such systems commonly include a transducer of some type for deriving the so-called process variable input voltage. This process variable input voltage is usually compared to a known adjustable set point reference voltage in a main process controller, and by such comparison an error signal is generated. This error signal is in turn utilized to drive a final control element, such as for example a current-pressure (I/P) transducer. This transducer actuates a pneumatic valve which in turn operates to control the process flow rate. By this closed loop feedback control, an undesirable deviation in a process flow rate may be reduced or eliminated.

When a certain process requires control of a stream flow rate, a differential pressure (D/P) transducer is frequently used as the process variable sensor, and the output electrical signal of this sensor is proportional to the square of the process flow rate. In order to utilize the output electrical signal of the D/P transducer in a linear closed loop control system, it becomes necessary to extract the square root of such electrical signal and use this square root signal together with the required D.C. offset voltage as the linear variable to drive a flow controller in the control system. Therefore, it becomes necessary to connect a square root extractor stage between the D/P transducer and the main flow controller in order to provide a process variable input signal to the main flow controller which varies linearly with changes in the process flow rate.

DESCRIPTION OF PRIOR ART

Various types of square root extractor circuits are known in the process control art, and one type of known square root extractor stage includes a plurality of silicon carbide discs which are connected to the input of an operational amplifier. The combination of these silicon carbide discs and the operational amplifier operates to give an output voltage which varies exponentially with variations in the input voltage and thereby produces a square root extracting function. This type of square root extractor is disadvantageous from the standpoint of its relatively high cost and the careful selection of the discs which is normally required.

Another type of prior art square root extractor utilizes a plurality of diodes connected in parallel and together in shunt with the input of an operational amplifier stage. These diodes are biased so that they will conduct at different levels of the input signal and thus increase the number of parallel-diode current paths at the input of the operational amplifier stage with increasing levels of input signal voltage. A main disadvantage in using a square root extractor with the above-described parallel diode input circuit design is that the square root extractor stage has a sharp cornered voltage gain characteristic. The sharp corners of this voltage gain characteristic are the result of the well known current-voltage characteristics of a diode, which diode typically has a threshold or offset voltage in the order of 0.7 volts. Such sharp "corners" on the voltage gain characteristic of this known type of square root extractor are obviously undesirable, since a smooth, exponentially shaped voltage gain characteristic of the square root extractor stage is best for precise linear control of the main flow controller.

Another type of prior art square root extractor stage utilizes parallel transistor paths, rather than diode current paths, in shunt with the input of an operational amplifier. Since the transistor operates with a somewhat exponentially shaped current-voltage, i.e. collector current vs. collector-to-emitter voltage characteristic, the use of transistors instead of diodes in the "front end" of an operational amplifier eliminated the sharp corners of the extractor's voltage gain characteristic. Thus, as each of the parallel connected transistors are biased into conduction with an increasing level of input signal voltage at the input of the square root extractor stage, the net result is that the exponential voltage gain characteristic of the square root extractor is a much smoother exponential or square root curve than that produced by the successive conduction of the paralleled diodes.

While overcoming the previously described disadvantage associated with the paralleled-diodes square root extractor voltage gain characteristic and effectively smoothing out this voltage gain characteristic, the paralleled transistors connected in shunt with the input of the operational amplifier have several distinct disadvantages. One such disadvantage is that during the operation of the square root extractor, the input impedance of the operational amplifier therein is not constant. This means that a constant current source is required to drive the extractor and therefore limits the type of D/P transducer than can be used with the square root extractor. A second disadvantage of the latter prior art type of square root extractor is that each time a different current range is used for the variable input signal applied to the operational amplifier of the square root extractor, it is necessary to make impedance adjustments in each parallel current path in which the transistors are connected. Thus, if it is desired to switch from a 4–20 miliamp to a 10–50 miliamp current range for the process variable input signal, then the resistance in each of the parallel connected transistor shunt paths at the input of the operational amplifier should be adjusted accordingly.

OBJECTS AND FEATURES OF THE INVENTION

An object of the present invention is to provide a new and improved square root extractor for a process control system and one possessing none of the aforedescribed disadvantages of the prior art square root extractor circuits.

Another object of this invention is to provide a new and improved square root extractor circuit which requires no impedance adjustments to be made for changes in the current range of the process variable input signal or of changes in the D.C. offset voltage which is summed with the process variable input signal.

Another object of this invention is to provide a new and improved square root extractor circuit which does not require a constant current source for the process variable input signal.

Another object of the present invention is to provide a novel square root extractor circuit having a smooth, exponentially shaped voltage gain characteristic.

Another object of this invention is to provide a new and improved solid-state square root extractor circuit utilizing a novel combination of integrated and discrete semiconductor circuitry in a relatively low cost and highly reliable electronic circuit.

A feature of the present invention is the provision of a square root extractor including a nonlinear amplifier stage exhibiting a smooth, exponentially shaped voltage gain characteristic.

Another feature of the present invention is the provision of a nonlinear feedback network within the nonlinear amplifier stage, and the nonlinear feedback network includes a plurality of parallel current paths. These parallel current paths each include a transistor, with the transistors in each path operatively biased at different D.C. potentials, so that these transistors are successively driven into conduction with an increasing amplitude of the input signal voltage applied to the nonlinear amplifier stage.

Another feature of this invention is the provision for DC bias circuitry connected to the nonlinear amplifier stage for summing a different, selected DC offset voltage with both a process variable input signal applied to the nonlinear amplifier stage and with the square root extracted signal at the output thereof.

SUMMARY OF THE INVENTION

Briefly described, the square root extractor according to the present invention comprises a nonlinear amplifier stage including a linear operational amplifier having input and output terminals. A nonlinear feedback network is connected between these input and output terminals, and such nonlinear feedback network provides a feedback current which increases parabolically as a function of the input voltage applied to the nonlinear amplifier stage. As a result of this voltage dependent feedback current, the output voltage of the nonlinear amplifier stage increases exponentially as a function of the input voltage applied thereto. Therefore, the voltage gain characteristic of the nonlinear amplifier stage approximates a reciprocal function of the parabolic variation in the pressure-versus-flow rate characteristic of differential pressure transducer used to drive the nonlinear amplifier stage. Thus, the product of the exponential voltage gain characteristic of the nonlinear amplifier stage and the parabolic output signal versus process flow rate characteristic of the D/P transducer is approximately a linear voltage variation which is used to linearly control a flow controller.

The above description and other objects and features of the present invention will become more fully apparent and better understood from the following description of the accompanying drawings.

DETAILED DESCRIPTION OF THE PREFERRED EMBODIMENT

Figure 1:
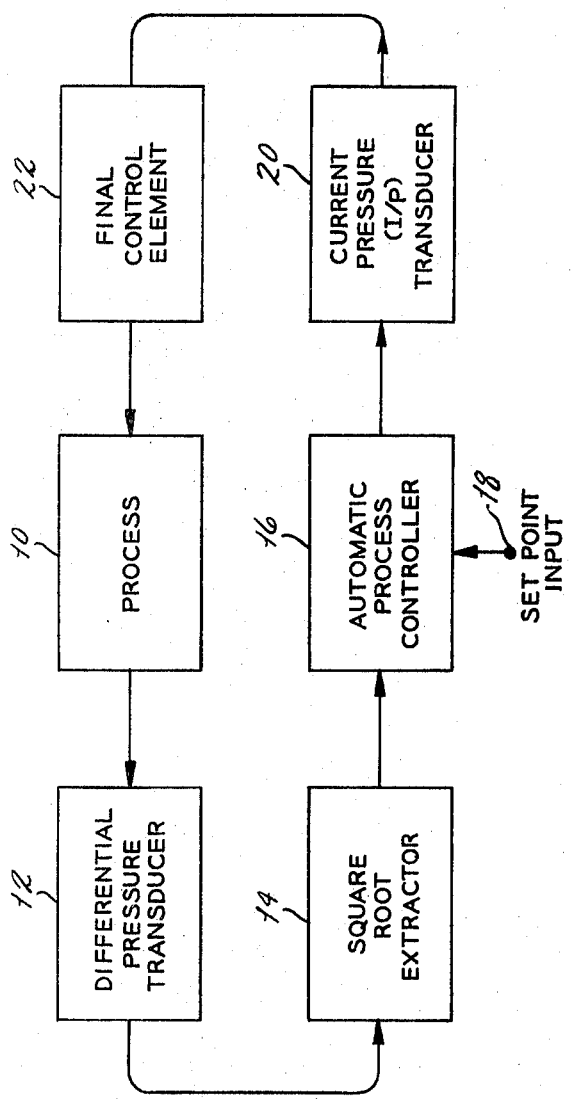
FIG. 1 is a simplified functional block diagram of a process control loop in which the square root extractor according to the present invention is utilized.

Referring to FIG. 1 of the drawings, there is shown a closed-loop process control system in which the process 10 to be controlled is part of the closed-loop system. In the present illustrative embodiment of this invention wherein the flow rate of the process 10 is to be controlled, a differential pressure (D/P) transducer 12 is coupled via a gas or fluid pressure to the process 10. The D/P transducer 12 provides an electrical process variable signal, $V_{in}$, which is proportional to the square of the flow rate or velocity of the process 10. That is, the process variable input voltage $V_{in}$ varies linearly with the pressure of the D/P transducer 12, but since the differential pressure of the D/P transducer 12 varies in direct proportion to the square of the flow rate of the process 10, the process variable $V_{in}$ is proportional to the square of the flow rate of the process 10.

A square root extractor circuit 14 provides an exponential output voltage-versus-input voltage (gain) characteristic, and this exponential curve can be adjusted to an approximate reciprocal image of the parabolic pressure-versus-flow rate characteristic of the differential pressure transducer 12. Therefore, the function of the square root extractor 14 is to provide an input signal voltage to the automatic process controller 16 which varies linearly as a function of the flow rate of the process 10. Such linearly varying input signal which is applied to the automatic process controller 16 is compared therein to a reference voltage at the set point input 18 to thereby generate an error signal for driving a current-pressure (I/P) transducer 20. The I/P transducer 20 in turn provides the corrective mechanical input to the final control element 22, such as a pneumatic flow valve, and by the well known servo closed loop process control, the flow rate of the process 10 can be returned to a desired value in accordance with the value of the reference voltage at the set point input 18.

Figure 2:
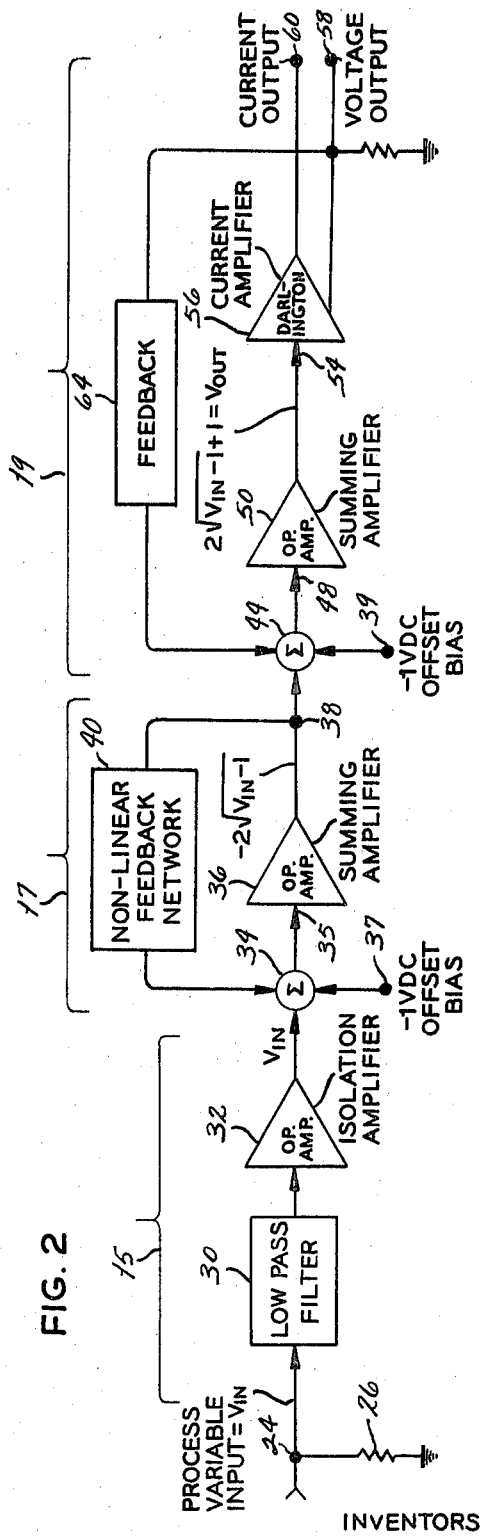
FIG. 2 is a functional block diagram of the square root extractor according to the present invention.
Figures 3, 4:
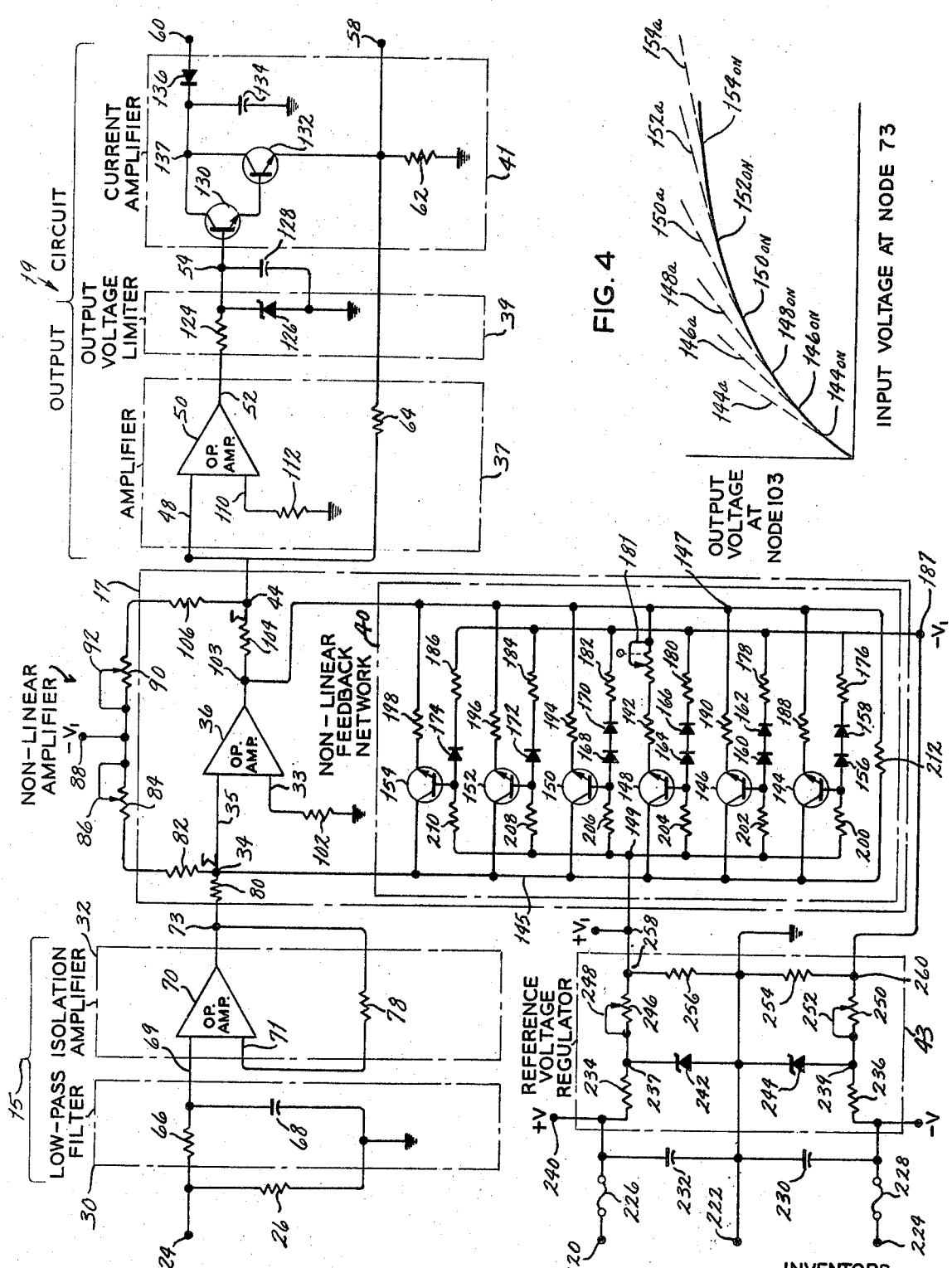
FIG. 3 is a schematic diagram of the square root extractor according to the present invention. Like reference numerals have been used to identify corresponding components in the embodiment of the invention illustrated in FIGS. 2 and 3, respectively.
FIG. 4 illustrates the voltage gain characteristic of the nonlinear amplifier shown in FIGS. 2 and 3.

Referring now to both FIGS. 2 and 3, the square root extractor 14 includes an input circuit 15, an intermediate nonlinear amplifier stage 17 and an output circuit 19. The input circuit 15 includes an input node or terminal 24 which is adapted to receive the process variable input signal $V_{in}$ from the output of the differential pressure transducer 12 shown in FIG. 1. A desired input impedance for the square root extractor 14 is established by input resistor 26. This low valued input resistor is necessary for proper impedance matching purposes and because of the very high input impedance of the operational amplifier 70 to be described. A low pass filter 30 including series resistor 66 and shunt capacitor 68 remove noise from the process variable analog input signal $V_{in}$ before it is applied to the noninverting input 69 of the isolation amplifier 32. The value of the RC time constant for resistor 66 and capacitor 68 (see table below) is such that all frequencies above approximately 8 hertz are filtered to ground through capacitor 68.

The isolation amplifier 32 includes an operational amplifier portion 70 having noninverting and inverting inputs 69 and 71, respectively, and a feedback resistor 78 is interconnected between the output terminal 73 of the operational amplifier 70 and the inverting input 71 thereof. Advantageously, the operational amplifier 70 may be readily selected from many commercially available types of operational amplifiers, and amplifier 70 may conveniently be a monolithic integrated circuit operational amplifier. The same is true for operational amplifiers 36 and 50 to be described herein.

A typical integrated circuit operational amplifier 70, the following portions of which are not shown in the drawing, often includes a first differential amplifier stage that provides most of the amplifier circuit gain. An intermediate differential stage is usually included to provide some additional gain where such is required, and a DC level shifting or translating stage is commonly connected to the output of the intermediate stage to remove undesired DC components which are introduced into the amplified signal in the two preceding stages. An output current amplifier stage is typically connected to this level translating stage to provide the required output voltage swings and the required output current drive capability for the operational amplifier. For improved frequency compensation, external capacitors are frequently connected between stages or to individual transistors in a single stage of the operational amplifier. Using present state of the art integrated circuit processing techniques, it is not normally feasible or practical to fabricate these frequency compensating capacitors as PN junction capacitors within the monolithic die or chip in which the operational amplifier integrated circuit 70 is constructed. The output conductor 73 of the isolation amplifier stage 32 is connected to a 10 kilohm resistor 80 which sets the voltage gain of the nonlinear amplifier stage 17 to be described.

The nonlinear amplifier stage 17 includes a linear operational amplifier 36 and a nonlinear feedback network 40. The operational amplifier 36 may advantageously be a monolithic integrated circuit operational amplifier as described above, with one of its differential inputs 35 connected to an input summing node 34 between resistors 80 and 82. The resistor 82 and tapped resistor 84 are connected in series between the power supply terminal 88 and the input summing node 34, and the tapped resistor 84 permits a first variable DC offset voltage to be summed with the analog input signal voltage at node 34. A second differential input 33 of the operational amplifier 36 is grounded through the resistor 102. A 10 kilohm resistor 104 connects the output of the operational amplifier 36 to one input 48 of a linear voltage amplifier 50. Resistors 104 and 106 are connected to a common output summing node 44, and resistor 106 and a tapped resistor 90 are connected in series between the output summing node 44 and a power supply terminal 88. This connection enables a variable DC offset voltage to be applied to the output summing node 44 and added thereat to the output analog voltage of the operational amplifier 36 as will be further described in the following description of the square root extractor circuit operation. By varying the position of the tap 92 on the resistor 90, a second variable DC offset voltage may be summed with the analog output voltage at the output node 44 of the nonlinear amplifier 17.

A nonlinear feedback network 40 is connected directly between the output node 103 of the operational amplifier 36 and the input summing node 34. The nonlinear feedback network 40 includes six parallel connected NPN transistors 144, 146, 148, 150, 152 and 154, respectively. Temperature compensating diodes 156 and 158 interconnect the base of NPN transistor 144 and a negative reference voltage terminal 187. Temperature compensating diodes 160 and 162 are also connected to the base of NPN transistor 146, and in a similar manner, temperature compensating diodes 164, 166 and temperature compensating diodes 168, 170 are connected, respectively, to the bases of NPN transistors 148 and 150. Only single temperature compensating diodes 172 and 174 are connected to the respective bases of NPN transistors 152 and 154, because of the lower levels of current conduction in those transistors as compared to the previously identified transistors. All of the above-identified diodes are used to compensate for the tempreature dependent, base-emitter transistor offset voltage ($V_{BE}$) variations with temperature.

The above-identified temperature compensating diodes are connected respectively to a first series of base bias resistors 176, 178, 180, 182, 184 and 186, and these latter resistors are all connected to a common, negative reference voltage terminal 187. To complete the base bias strings for the above NPN transistors in feedback network 40 are a plurality of resistors 200, 202, 204, 206, 208 and 210 which interconnect the respective bases of these NPN transistors to a common, positive reference voltage terminal 149. Thus, these resistor-diode base bias "strings" are each connected between a common terminal 149 to which a positive regulated reference voltage is applied and a common terminal 187 to which a negative regulated reference voltage is applied. These base bias strings establish separate predetermined base potentials for each of these above-identified NPN transistors as a result of the different values of resistors 176, 178, 180, 182, 184 and 186. The six previously identified NPN transistors 144, 146, 148, 150, 152 and 154 are further connected to emitter current limiting resistors 188, 190, 192, 194, 196 and 198, respectively, which interconnect the emitters of these transistors to a common junction or circuit node 147. The node 147 is connected directly to the output conductor 103 of the operational amplifier 36.

The values of the two resistors in each base bias string identified above and the positive and negative DC reference potentials applied to the positive and negative reference voltage terminals 149 and 187, respectively, will determine the precise levels of input signal applied to the amplifier 17 required to drive these NPN transistors 144, 146, 148, 150, 152 and 154 into conduction. If desired, any one or more of the resistors connected to the above NPN transistors 144, 146, 148, 150, 152 and 154 could be made variable by use of a variable tap or the like. But it has been found that the use of a single potentiometer 181 in the emitter path of NPN transistor 148 will provide a variation in the smooth exponential shape of the voltage gain characteristic of the nonlinear amplifier circuit 17 which is sufficient to match the parabolic variation of the process variable input signal with changes in the process 10 flow rate. The output summing node 44 of the nonlinear amplifier stage 17 is connected directly to one differential input conductor 48 of a second high gain linear amplifier stage 37. The amplifier stage 37 may include, for example, an integrated circuit operational amplifier 50 having another input conductor 110 grounded through resistor 112.

The output conductor 52 of the amplifier stage 37 is connected to an output voltage limiter 39 which includes a series current limiting resistor 124 and a shunt connected Zener diode 126. An output filter capacitor 128 is connected in parallel with the Zener diode 126, and resistor 124 and capacitor 128 act as a low pass filter stage at the input of the output current amplifier. This low pass filter removes frequencies above approximately 3,500 hertz from the analog signal applied to the current amplifier stage 41.

The current amplifier stage 41 may advantageously include a Darlington transistor string, such as NPN transistors 132 and 132 which provide the desired output current gain or beta multiplication; and emitter resistor 62 interconnects the emitter of the output NPN transistor 132 and ground potential. A protection diode 136 interconnects the square root extractor current output node 60 and the common collector node 137 of the two Darlington connected NPN transistors 130 and 132. This diode prevents the collectors of transistors 130 and 132 from seeing any negative going AC voltage which may be inadvertently applied to the current output node 60, and the collector-emitter breakdown voltage of transistors 130 and 132 is normally high enough to prevent breakdown of these transistors by a positive going AC voltage which is inadvertently applied to output circuit node 60. Another decoupling capacitor 134 interconnects the common NPN Darlington transistor collector node 137 and ground potential, and an output voltage node or terminal 58 is connected directly to the emitter of NPN transistor 132. A desired process control output voltage, which is typically in the 1–5 volt range, may be derived at the output voltage node 58 as will be further described in the below description of circuit operation. If a variable output current signal isrequired, then the transistor 130,132 collector current is available at the current output node 60.

A reference voltage regulator network 43 is connected between first and second DC power supply terminals 220 and 224 and the previously identified positive and negative DC reference voltage terminals 149 and 187, respectively. The voltage supply terminals 220 and 224 are connected to resistance-capacitance filter networks consisting, respectively, of fuse 226 and capacitor 232 for the positive supply terminal 220 and fuse 228 and capacitor 230 for the negative supply voltage terminal 224. These RC filter networks serve to remove any DC ripple voltage at the positive and negative DC supply voltage terminals 220 and 224. The internal resistances of the fuses 226 and 228 provide the necessary series resistance for these low pass RC filters, and the fuses 226 and 228 provide overload protection for the reference voltage regulator circuit 43 to be further described.

The reference voltage regulator 43 includes a current limiting resistor 234 and a first reference voltage Zener diode 242 for limiting the positive voltage at node 237 to a desired positive DC level. Similarly, a current limiting resistor 236 and a second reference voltage Zener diode 244 limit the negative voltage at node 239 to a desired negative DC level. The reference voltage regulator output nodes 260 and 261 are thus referenced to the DC levels at nodes 237 and 239, respectively, and may be varied or shifted with respect thereto by varying the positions of variable taps 248 and 252. The reference voltage regulator 43 further includes output resistors 254 and 256 which are interconnected between the output reference points 260 and 261 and a common ground node 222. These resistors 254 and 256 are selected to provide the desired positive and negative reference potentials at the output reference points 258 and 260, respectively. These output reference voltage nodes 258 and 260 of the reference voltage regulator 43 are connected directly to the positive reference voltage terminal 149 and the negative reference voltage terminal 187, respectively, and the reference voltages at these terminals are adjustable to predetermined negative and positive DC voltage levels by the use of variable taps 248 and 252.

DESCRIPTION OF SQUARE ROOT EXTRACTOR CIRCUIT OPERATION

The process variable input signal $V_{in}$, which varies in direct proportion to the square of the flow rate of the process 10 being controlled, is coupled to the input node 24 of the square root extractor 14 and applied directly to the previously described low pass filter 32. The signal $V_{in}$ is filtered by stage 30, and all frequencies above approximately 8 hertz are shunted to ground through capacitor 68. The analog filtered signal is then amplified by isolation amplifier stage 32 and is then summed at node 34 with a selected offset voltage, $V_{offset_1}$. This offset voltage is established by adjusting the variable tap 86 on the resistor 84, and the purpose of this offset voltage is to enable a 0 to 100 percent span of a control valve to be correlated with a desired range of square root extractor output voltages. The exact reason for this offset voltage will be described in more detail hereinafter. The first offset voltage $V_{offset_1}$ is summed with the process input variable $V_{in}$ at node 34, so that the process variable input voltage $V_{in}$ plus the negative offset voltage $V_{offset_1}$ is applied via conductor 35 to the nonlinear amplifier 40.

As the nonlinear amplifier 17 input voltage $V_{in} - V_{offset}$ ($V_{offset_1}$ is constant) increases, the amplifier feedback current increases parabolically. This parabolic increase in amplifier feedback current is caused by the fact that the transistors 144, 146, 148, 150, 152 and 154 are successively biased into conduction at selected levels of the input sum $(V_{in} - V_{offset_1})$ applied to amplifier 17. The gain of the nonlinear aplifier 17 is proportional to the amplifier input and feedback resistances in accordance with the equation:

$$GAIN_{17} \propto \frac{R_{feedback_{40}}}{R_{input_{80}}} \quad (1)$$

where $R_{feedback_{40}}$ is in total effective resistance of feedback network 40 and $R_{input_{80}}$ is the resistance of the input resistor 80. Therefore, since $R_{feedback}$ varies exponentially with a parabolic increase in feedback current of the nonlinear feedback network 40, the nonlinear amplifier 17 output voltage will vary exponentially with an increasing voltage level of the input signal applied to the amplifier 17. As each of the parallel connected transistors in the nonlinear feedback network 40 are successively biased into conduction with increasing levels of input voltage applied to amplifier 17, more parallel feedback resistance is effectively added to network 40. This causes the slope of the output voltage-versus-input voltage (gain) characteristic of the nonlinear amplifier 17 to progressively decrease and thus assume the smooth exponential shape shown in FIG. 4. FIG. 4, which is not drawn to an exact scale, illustrates the points on the voltage gain characteristic of the nonlinear amplifier 17 that the feedback network 40 transistors are driven into conduction. Actually, the output voltage range at node 103 is between 0–4 volts whereas the input voltage range at node 73 is between 1–5 volts. Thus, the line 144a is an approximation of the slope of the voltage gain characteristic of nonlinear amplifier stage 17 when transistor 144 turns on. At the point designated 146(on) on the exponential gain characteristic, transistor 146 turns on, and the line 146a is an approximation of slope of the voltage gain characteristic with only transistors 144 and 146 in feedback network 40 conducting. Similarly, as transistors 148, 150, 152 and 154 are driven into conduction at the respective points indicated on the voltage gain characteristic in FIG. 4, the lines 148a, 150a, 152a and 154a are approximations of the slope of the voltage gain characteristic with these transistors in conduction. The exact slopes of these lines 144a, 146a, 148a, 150a, 152a, and 154a are defined by the well-known collector current-collector-emitter voltage (Ic vs. Vce) characteristics of the transistors in feedback network 40 that are conducting. And, as previously indicated, a change in the position of tap 181 in the emitter circuit of transistor 148 will not only change the Ic vs. Vce characteristic of this one transistor, but will also reshape the overall gain curve shown in FIG. 4 to a smooth desired exponential shape. By the above nonlinear gain action of the amplifier 17, the output voltage of the operational amplifier portion 36 of the nonlinear amplifier stage 17 may be expressed as:

$$V_{out(36)} = -K\sqrt{V_{in} - V_{offset_1}}, \quad \text{(Equation 2)}$$

wherein $V_{in}$ is the process variable input voltage applied to node 34, $V_{offset_1}$ is a first, negative offset voltage summed with $V_{in}$ at node 34, and $K$ is a gain constant of the nonlinear amplifier 17.

The output voltage $V_{out(36)}$ is further summed with a second, negative offset voltage $V_{offset_2}$ at node 44, so that the output voltage appearing at the node 58 may be expressed as:

$$V_{out(58)} = K\sqrt{V_{in} - V_{offset_1}} + V_{offset_2}, \quad \text{(Equation 3)}$$

The above output voltage relationships set forth in equations 2 and 3 above may be best explained by the illustration below which describes the relationship between $V_{out(36)}$ and $V_{out(58)}$ and the 0–100 percent span of the control or pneumatic flow valve (not shown) in the differential pressure transducer 12 and its corresponding process variable voltage. The position of the flow valve in the differential pressure transducer 12 may be varied from a closed position or a 0 percent span opening to a full open or 100 percent span open position. For this 0–100 percent span of the flow valve, the span dependent process variable input voltage $V_{in}$ which is DC coupled to node 34 will vary exponentially from 1 volt at a 0 percent span opening to 5 volts at a 100 percent span opening. However, in accordance with the present invention, it is desired to provide a process variable voltage which varies linearly at voltage output terminal 58 from 1 volt at a 0 percent span opening to 5 volts at a 100 percent span opening of the flow valve within the differential pressure transducer 12.

In order to provide the above linear range of output voltages at output terminal 58, a $V_{out(58)}$ output voltage of 1 volt in equation 3 above should correspond to a $V_{in}$ of 1 volt at 0 percent span. Similarly, an output voltage $V_{out(58)}$ of 5 volts at output terminal 58 should correspond to a $V_{in}$ of 5 volts at 100 percent span. And the valve of $V_{in}$. For this reason, the first and second offset voltages $V_{offset_1}$ and $V_{offset_2}$ have been selected equal to $-1$ volt. Thus, the output voltage $V_{out(58)}$ may now be expressed as:

$$V_{out(58)} = K\sqrt{V_{in}-1} + 1 \quad \text{(Equation 4)}$$

For a process variable input voltage $V_{in}$ of 1 volt at input terminal 24, $V_{out(58)}$ at output terminal $58 = 0 + 1$ or 1 volt. For a process variable input voltage of 5 volts, then the output voltage $V_{out(58)}$ must equal 5 volts. Thus, the quantity $K\sqrt{5-1} + 1$ must equal 5, so that the constant gain factor $K$ of the nonlinear amplifier 17 must be equal to 2 in order to satisfy the above relationship. The gain of amplifier 17 may be established in accordance with equation 1 above. The variable tap 181 previously described can be adjusted so that at 0 and 100 percent span of the transducer 12 control valve, the output voltage at output terminal 58 is equal to the process variable input signal $V_{in}$ at input terminal 24. For all values of $V_{in}$ within the 1 and 5 volt range, $V_{out(58)}$ will be equal to the square root of the process variable input voltage $V_{in}$ in accordance with the relationship:

$$V_{out(58)} = 2\sqrt{V_{in}-1} + 1 \quad \text{(Equation 5)}$$

The output signal expressed in equation 5 above, which varies in linear proportion to the flow rate of the process 10 being controlled, is limited by the output voltage limiter 39 and then coupled to the base of Darlington-connected transistor 130 in the current amplifier 41. The collector currents of the Darlington-connected transistors 130 and 132 are proportional to the output voltage expressed in equation 3 above and are available current at output node 138 as a process variable controller input current if such is required by a current responsive controller, recorder or other current responsive instrument. The emitter current of output NPN transistor 132, which is approximately equal to the collector current of this transistor for the common emitter transistor configuration used, develops the process variable output voltage $V_{out(58)}$ across emitter resistor 135. This output voltage is available at the voltage output terminal 58 and is used to drive the automatic process controller 16 shown in FIG. 1.

The following table of values and component types represent those components used in a square root extractor of the type described above which has been actually built and successfully tested and operated.

TABLE

| COMPONENTS | VALUE OR TYPE |
|---|---|
| Resistors | |
| 26 | 200 Kilohms |
| 62 | 47 Kilohms |
| 64 | 10 Kilohms |
| 66 | 34 Kilohms |
| 78 | 34 Kilohms |
| 80 | 10 Kilohms |
| 82 | 57.6 Kilohms |
| 84 | 10 Kilohms |
| 90 | 10 Kilohms |
| 102 | 7.5 Kilohms |
| 104 | 10 Kilohms |
| 106 | 57.6 Kilohms |
| 112 | 4.7 Kilohms |
| 124 | 1 Kilohm |
| 176 | 76.8 Kilohms |
| 178 | 69.8 Kilohms |
| 180 | 57.6 Kilohms |
| 181 | 10 Kilohms |
| 184 | 36.5 Kilohms |
| 186 | 24.3 Kilohms |
| 192 | 30.1 Kilohms |
| 194 | 24.9 Kilohms |
| 196 | 24.3 Kilohms |
| 198 | 31.6 Kilohms |
| 200 | 100 Kilohms |
| 202 | 100 Kilohms |
| 204 | 100 Kilohms |
| 206 | 100 Kilohms |
| 208 | 100 Kilohms |
| 210 | 100 Kilohms |
| Resistors | |
| 212 | 64.9 Kilohms |
| 234 | 768 Ohms |
| 236 | 750 Ohms |
| 246 | 200 Ohms |
| 250 | 200 Ohms |
| 254 | 1.78 Kilohms |
| 256 | 1.78 Kilohms |
| Capacitors | |
| 68 | 0.68 Microfarads |
| 128 | 0.047 Microfarads |
| 134 | 0.01 Microfarads |
| Transistors | |
| 130 | 2N40327 |
| 132 | 40422 or 2N3738 |
| 144 | 2N3567 |
| 146 | 2N3567 |
| 148 | 2N3567 |
| 150 | 2N3567 |
| 152 | 2N3567 |
| 154 | 2N3567 |
| Operational Amplifiers | |
| 36 | ½ MC1437L |
| 50 | ½ MC1437L |
| 70 | MC1439G |

However, it should be understood that the present invention may be practiced other than as specifically described above. For example, the nonlinear feedback network 40 is not limited in its construction to the use of NPN transistors 144, 146, 148, 150, 152, and 154; and these transistors may be PNP type transistors. In fact, other three, four and more layer semiconductor devices which are capable of being successively biased into conduction with varying amplitude levels of the input signal voltage applied to the nonlinear amplifier network 17 may be substituted for the above-identified transistors in the nonlinear feedback network 40. Additionally, the operational amplifiers 36, 60 and 70 are not limited to the particular integrated circuit types listed in the table above, and may be modified or replaced with other different types of operational amplifiers by those skilled in the art.

We claim:

1. A square root extractor circuit for a process control system including, in combination:
   a. a nonlinear amplifier having an exponential voltage gain characteristic and including feedback means comprising a plurality of transistors connected, respectively, in a plurality of parallel feedback paths for said amplifier, and
   b. DC bias means connected to said nonlinear amplifier for applying thereto at least one predetermined offset voltage, said DC bias means also including means for biasing each of said plurality of said transistors at different DC bias potentials, respectively, whereby said plurality of transistors are operative to be successively biased into conduction at increasing levels of input signal voltage applied to said amplifying means, thereby providing a corresponding parabolic increase in feedback current for said amplifier and a corresponding exponential change in voltage gain characteristic thereof.

2. The square root extractor defined in claim 1, wherein:
   a. said DC bias means includes means for summing a first offset voltage, $V_{offset_1}$, with a process variable input voltage, $V_{in}$, and applying the sum of these two voltages to said nonlinear amplifier means, whereby the output voltage of said nonlinear amplifier means is equal to $$K\sqrt{V_{in} - V_{offset_1}}$$

where $K$ is a gain constant of said nonlinear amplifier means, and
   b. said DC bias means further includes means for applying a second offset voltage, $V_{offset_2}$, to an output summing node at the output of said nonlinear amplifier whereby the output voltage $K\sqrt{V_{in} - V_{offset_1}} + V_{offset_2}$ may be derived at said output summing node.

3. The square root extractor defined in claim 2 wherein said gain constant $K$ is equal to 2, and said first and second offset voltages, $V_{offset_1}$ and $V_{offset_2}$, are both equal to 1 volt in magnitude.

4. Electronic circuitry for producing an output signal which varies in proportion to the square root of an input signal, said circuitry including, in combination:
   a. amplifying means having input and output terminals,
   b. a plurality of feedback transistors connected respectively in parallel paths between said input and output terminals of said amplifying means and operatively biased to conduct at different levels of input signal, and
   c. means for biasing each of said transistors at selected different DC potentials, so that said transistors are biased into conduction at different levels of input signal applied to said input terminal of said amplifying means, whereby as each of said transistors is successively biased into conduction, additional feedback paths are connected between said input and output terminals of said amplifying means to thereby cause the gain of said amplifying means to smoothly vary exponentially.

5. Electronic circuitry defined in claim 4 which further includes:
   a. second amplifying means connected to the output of said first amplifying means for inverting the output signal of said first amplifying means,
   b. voltage limiting means connected to the output of said second amplifying means for limiting the voltage swing of the output signal of said second amplifying means to a predetermined amplitude, and
   c. current amplifying means connected to the output of said voltage limiting means for providing a predetermined level of output signal current at an output terminal of said electronic circuitry, said output signal current also serving to develop a required range of output voltages at the output of said current amplifying means for driving a voltage responsive controller.

6. Electronic circuitry defined in claim 5 which further includes:
   a. low pass filter means connected to receive a process variable input signal and removing noise therefrom,
   b. isolation amplifying means interconnecting the output of said low pass filter means to said input terminal of said first amplifying means for presenting a desired high impedance load to the source of said process variable input signal, and
   c. shunt impedance means connected in parallel with said low pass filter means for establishing a desired input impedance for said square root extractor and effectively bypassing the high input impedance of said isolation amplifying means.

7. A square root extractor circuit adapted for operation in a process control loop wherein a differential pressure transducer generates a process variable input signal which is proportional to the square of the flow rate of the process being controlled, said square root extractor including, in combination:
   a. amplifying means having input and output terminals and operative to receive said process variable input signal,
   b. nonlinear feedback means between said output and input terminals of said amplifying means including a plurality of transistors connected, respectively, in a plurality of parallel feedback paths for providing a feedback current which increases parabolically as a function of the input signal applied to said input terminal of said amplifying means, and
   c. means for biasing each of said plurality of said transistors with a plurality of separate DC bias potentials, whereby said plurality of transistors are operative to be successively biased into conduction with increased levels of input signal voltage applied to said amplifying means,
   d. means for applying a first offset voltage to an input summing node to which said input terminal is connected, whereby said first offset voltage is summed with said process variable input signal, said output signal at said output terminal of said amplifying means varying in accordance with sum of the square root of said process variable input signal and said first offset voltage, and
   e. means for applying a second offset voltage to an output summing node so at the output of said amplifying means so that said second offset voltage is summed with the output voltage of said amplifying means, whereby said offset voltage may be varied in accordance with the desired range of input and output voltages for a given process control application.

8. The square root extractor defined in claim 7 wherein:
   a. said first and second offset voltages are equal in magnitude to 1 volt,
   b. said first offset voltage being summed with the process variable input voltage, $V_{in}$, to give the quantity $V_{in}-1$,
   c. said first amplifying means and said nonlinear feedback means forming a square root extracting nonlinear amplifier stage having an output voltage equal to $K\sqrt{V_{in}-1}$ where $K$ is a gain constant of said stage, and
   d. said second offset voltage being equal in magnitude to 1 volt and being summed with the output voltage of said nonlinear amplifier stage to thereby provide an output voltage equal to $2\sqrt{V_{in}-1}+1$ where $K=2$ for a linear output voltage range from 1 to 5 volts.

9. The square root extractor defined in claim 7 which further includes:
   a. second amplifying means connected to the output terminal of said first amplifying means for inverting the voltage at said output summing node,
   b. voltage limiting means connected to the output terminal of said second amplifying means and limiting the voltage amplitude level at the output of said second amplifying means, and
   c. current amplifying means interconnected between the output of said second amplifying means and a circuit output terminal for providing a desired level of output current or output voltage for said square root extractor.

10. The square root extractor defined in claim 9 which further includes:
    a. low pass filter means connected to a circuit input terminal for receiving a process variable input signal and removing noise from same, and
    b. isolation amplifier means interconnecting said low pass filter means and said input summing node for providing a desired amount of electrical isolation between said first amplifying means and said circuit input terminal.

11. The square root extractor defined in claim 10 which further includes:
    a. reference voltage regulating means interconnected between sais first and second power supply terminals and first and second reference voltage input terminals, respectively, of said nonlinear feedback means, said reference voltage regulating means providing substantially constant DC bias voltages for said plurality of said parallel connected transistors in said nonlinear feedback means,
    b. adjustable reference voltage means within said reference voltage regulating means and connected to the base electrodes of said plurality of said transistors in said nonlinear feedback means for varying the base bias potentials on said plurality of said parallel connected transistors, whereby the input signal voltage level applied to said first amplifying means which is required to successively bias said plurality of transistors into conduction may be varied, and
    c. adjustable impedance means connected to at least one of said plurality of said parallel connected transistors for controlling the exact exponential shape of the voltage gain characteristic of the combination of said first amplifying means and said nonlinear feedback means which together form a nonlinear amplifier stage.

* * * * *